United States Patent [19]
Driggett

[11] Patent Number: 6,044,596
[45] Date of Patent: Apr. 4, 2000

[54] BUILDING COMPLEX FOR DISPOSING OF TOXIC AND OTHERWISE HAZARDOUS WASTE MATERIALS

[75] Inventor: Richard A. Driggett, Elgin, Ill.

[73] Assignee: Tox-Wastech, Inc., Wheaton, Ill.

[21] Appl. No.: 09/251,230

[22] Filed: Feb. 16, 1999

Related U.S. Application Data

[63] Continuation of application No. 08/771,604, Dec. 20, 1996, abandoned.

[51] Int. Cl.[7] ................................................. E04H 5/06
[52] U.S. Cl. .................. 52/169.2; 52/169.6; 52/169.14; 52/236.1; 588/250
[58] Field of Search ............................ 52/169.1, 169.2, 52/169.6, 169.14, 175, 176, 184, 185, 187, 189, 236.1, 236.4, 234; 588/250, 252, 256, 258; 442/172, 179, 129; 428/301.4

[56] References Cited

U.S. PATENT DOCUMENTS

| | | | |
|---|---|---|---|
| 700,794 | 5/1902 | Martin-Cooke | 52/185 |
| 1,242,012 | 10/1917 | Lynch | 52/236.1 X |
| 1,425,114 | 8/1922 | Luard | 52/236.1 X |
| 2,154,897 | 4/1939 | Grant | 52/236.1 X |
| 2,156,859 | 5/1939 | Lowe | 52/236.1 X |
| 3,535,835 | 10/1970 | Kupper | 52/185 X |
| 3,714,304 | 1/1973 | Carner et al. | 52/236.1 X |
| 4,231,201 | 11/1980 | Harnois | 52/169.6 |
| 5,409,777 | 4/1995 | Kennedy et al. | 428/411.1 |
| 5,545,796 | 8/1996 | Roy et al. | 588/256 X |

FOREIGN PATENT DOCUMENTS

| | | | |
|---|---|---|---|
| 71089 | 9/1983 | European Pat. Off. | 52/236.1 |
| 406167130 | 6/1994 | Japan | 52/175 |
| 634012 | 11/1978 | Russian Federation | 52/175 |
| 381846 | 11/1964 | Switzerland | 52/236.1 |

*Primary Examiner*—Carl D. Friedman
*Assistant Examiner*—Winnie Yip
*Attorney, Agent, or Firm*—Richard G. Lione; Brinks Hofer Gilson & Lione

[57] ABSTRACT

A building complex for disposing of toxic or otherwise hazardous waste materials. The complex comprises heptagonal shaped center core structure and five rhomboid shaped wing structures dedicated to waste disposal. The walls, floors and ceilings of the wings include a layer or layers of a composite material comprising a thermosetting or thermoplastic resin, high modulus carbon fibers or the like and borosilicate glass particulate.

1 Claim, 3 Drawing Sheets

BUILDING COMPLEX FOR DISPOSING OF TOXIC AND OTHERWISE HAZARDOUS WASTE MATERIALS

RELATED APPLICATION

This application is a continuation of application Ser. No. 08/771,604 filed Dec. 20, 1996.

FIELD OF THE INVENTION

This invention relates generally to a building complex. It relates particularly to a building complex suitable specifically for storing toxic and otherwise hazardous waste material.

BACKGROUND OF THE INVENTION

The disposal of toxic and otherwise hazardous waste material has become one of the major problems of our civilization. Literally hundreds of thousands of tons of such material are produced every day around the world. Historically, it has frequently been disposed of with little thought to the consequences. The results in human suffering and the cost of clean-up have not yet fully been felt.

Various approaches have been proposed for disposal of a wide range of waste materials. Abandoned mine shafts with suitably prepared containers are regularly discussed as possibilities. Prior to the development of the building complex embodying the present invention, however, no one has devised a realistic approach to disposal of such waste materials in a commercially feasible manner.

SUMMARY OF THE INVENTION

A primary object of the present invention is a building complex which is specifically constructed and arranged for toxic and otherwise hazardous waste disposal.

Another object is to provide a building complex which affords optimum waste disposal capability with minimum risk.

Yet another object is to provide a building complex which effectively segregates different categories of toxic and otherwise hazardous waste material so as to maximize control.

Still another object is to provide a building complex which is easily expandable to increase capacity when conditions dictate.

A further object is to provide a building complex of the aforedescribed character which facilitates the disposal and monitoring of such material.

The foregoing and other objects are realized by providing a toxic and otherwise hazardous waste disposal complex which includes a center core structure and a plurality of wing structures arranged in fan-like configuration around the center core. A series of separate wing structures radiating from the center core provide disposal areas for different waste materials, each wing being accessible only through the core, for security purposes as well as for economy of delivery. In addition to the disposal wings, one or more wings which also radiate from the core provide administrative and delivery facility.

The disposal wing structures are built on concrete foundations incorporating earthquake rollers. The wing structures themselves comprise reinforced concrete floors, walls and ceilings coated with composite material of the type disclosed in my co-pending U.S. patent application Ser. No. 08/509,249, filed Jul. 31, 1995.

BRIEF DESCRIPTION OF THE DRAWINGS

The invention, including its construction and arrangement, together with additional objects and advantages thereof, is illustrated more or less diagrammatically in the drawings, in which.

DESCRIPTION OF THE PREFERRED EMBODIMENT

Figure 1:
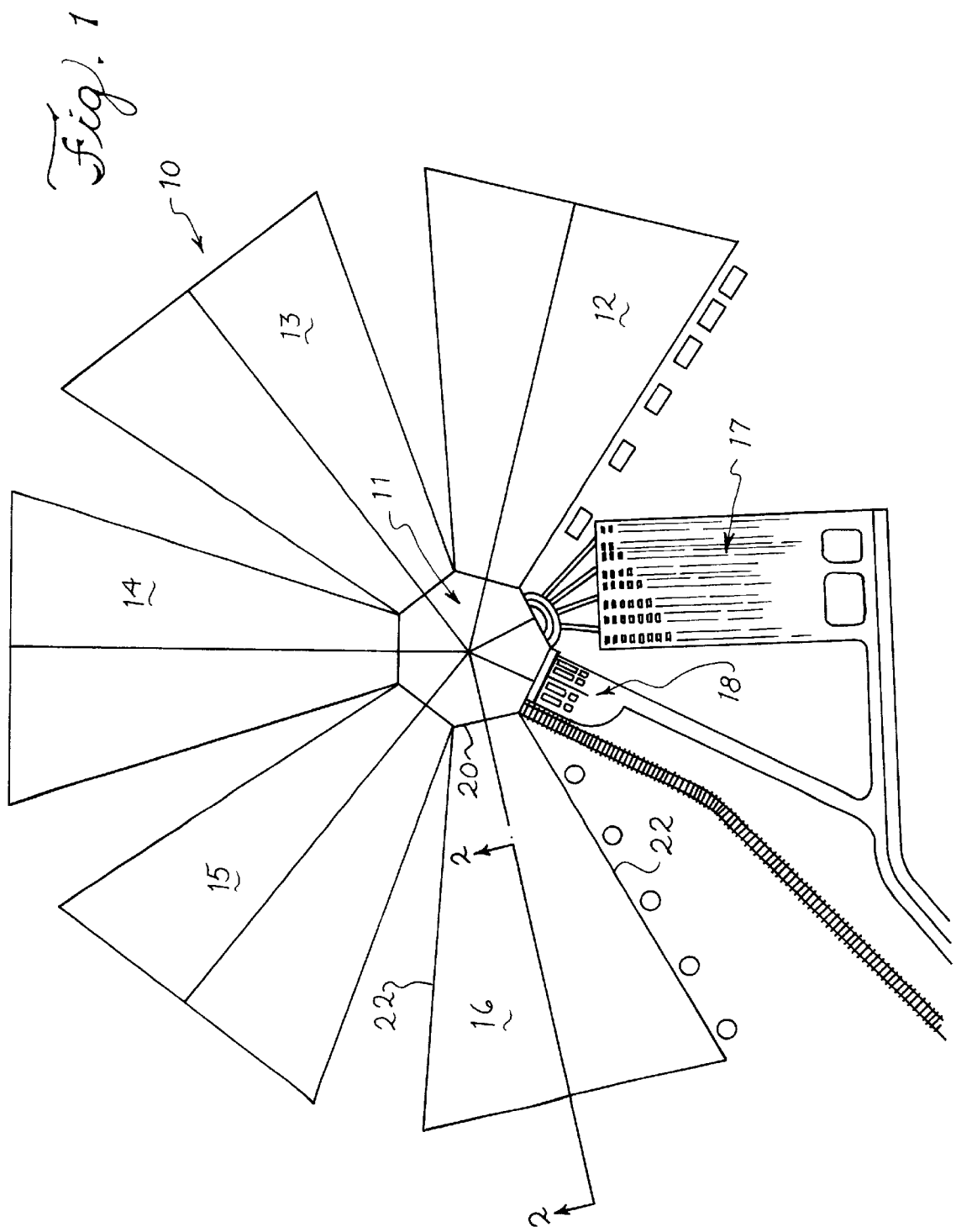
FIG. 1 is a plan view of a building complex embodying features of the present invention.

Referring now to the drawings, a building complex embodying features of the invention is illustrated generally at 10. The building complex 10 includes a center core structure 11 in the form of a heptagon shaped building. Radiating from the center core structure 11 are a series of five disposal wing structures 12,13,14,15 and 16.

Each of the disposal wing structures 12–16 is substantially identical in construction and arrangement. Accordingly, only wing structure 16 is described in detail here.

As seen in FIG. 1, the wing structure 16 includes an inner wall 20, an outer wall 21 and identical (two) side walls 22. The side walls 22 diverge from each other as they extend away from the core structure 11, creating a rhomboid shaped wing structure 16.

Figure 2:
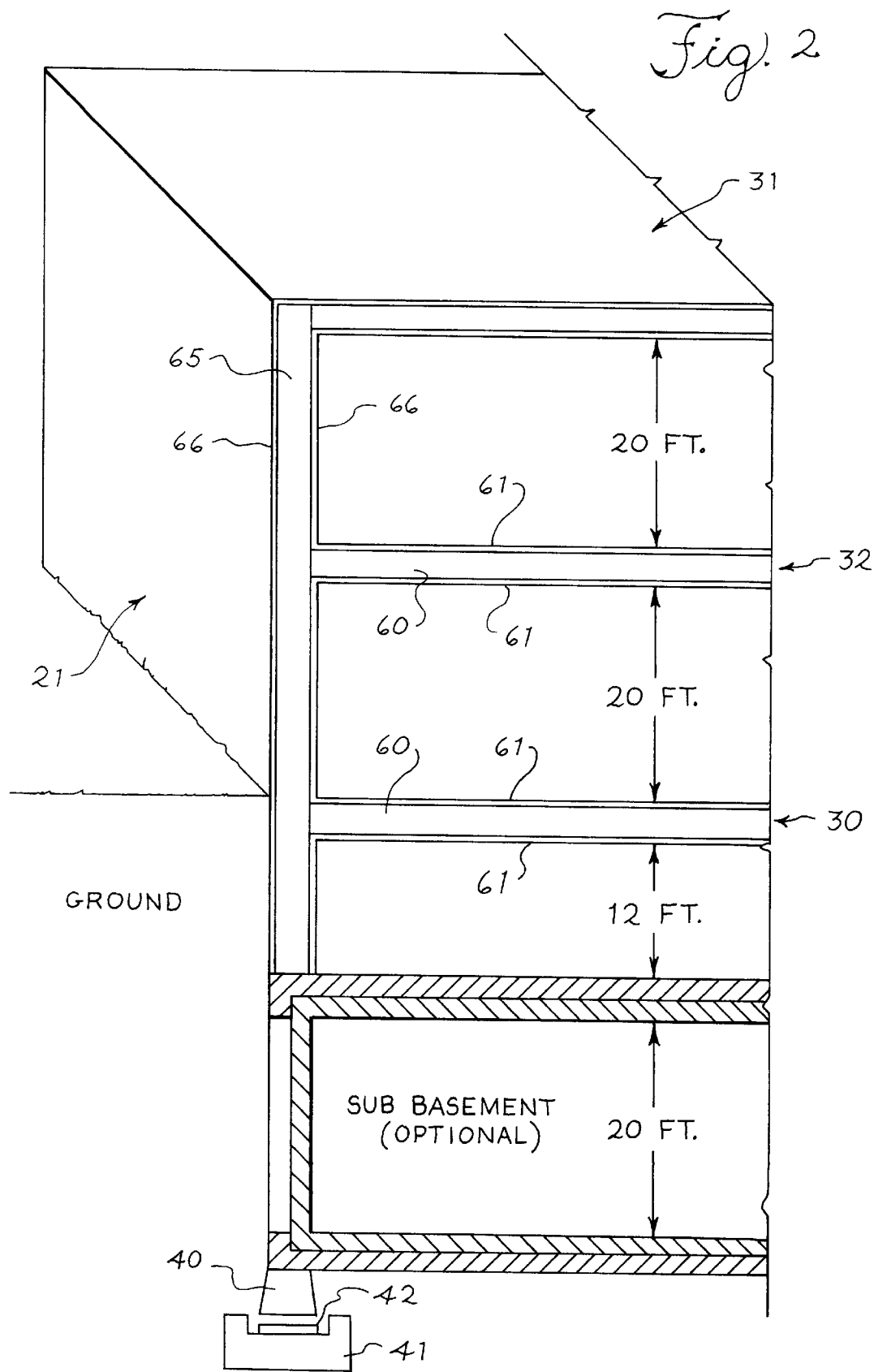
FIG. 2 is a partial sectional view taken along line 2—2 of FIG. 1.

The height of the wing structure 16 is optional but, in any case, it would include a ground level floor 30 and a roof 31. As seen in FIG. 2, in the structure 16 illustrated a second floor 32 is also provided, although the building structure would normally be built with only one floor at the outset.

Below ground level, the walls 21, 22 and 20 extend down to concrete footings 40. The footings 40, in turn, are seated on a concrete foundation 41. The foundation 41 is provided with conventional earthquake rollers 42 on which the footings 40 actually rest.

In the structure 16 illustrated, a basement 50 and sub-basement 51 are also provided. The sub-basement 51 is an optional component of the structure 16, however. In other words, the building structure 16 may be provided only with a single basement 50.

The floors 30 and 32, and the roof 31, include 11 and $11/16$ inch thick, steel rod reinforced concrete slabs 60 of conventional construction. The slabs 60 are coated, top and bottom, with a $5/32$ inch thick layer 61 of carbon composite material.

The carbon composite material used according to the present invention comprises a thermosetting or thermoplastic resin containing high modulus carbon particles or fibers and borosilicate glass particles. According to the invention, this composite is of the type described in the aforementioned co-pending U.S. patent application of applicant, Ser. No. 08/509,249, filed Jul. 31, 1995, the disclosure of which is incorporated herein by reference.

As the aforementioned co-pending U.S. patent application points out, the composite may alternatively include a thermosetting fluorinated resin, a thermosetting epoxy resin or a thermoplastic fluoropolymer resin. The thermosetting fluorinated resin is preferred in the composite, however.

Still referring to FIG. 2, the walls 20 and 21 of the structure 16 also include 11 and $11/16$ inch thick, steel rod reinforced concrete slabs 65. The slabs 65 are coated, inside and out, with a $5/32$ inch thick layer 66 of the same carbon composite material.

In the illustrated embodiment, the structure 16 includes a sub-basement 51, as has been pointed out. The sub-basement 51 is in this case, lined with ½ inch thick lead sheet to provide a receptacle for low level nuclear waste material. This is an entirely optional feature.

Figure 3:
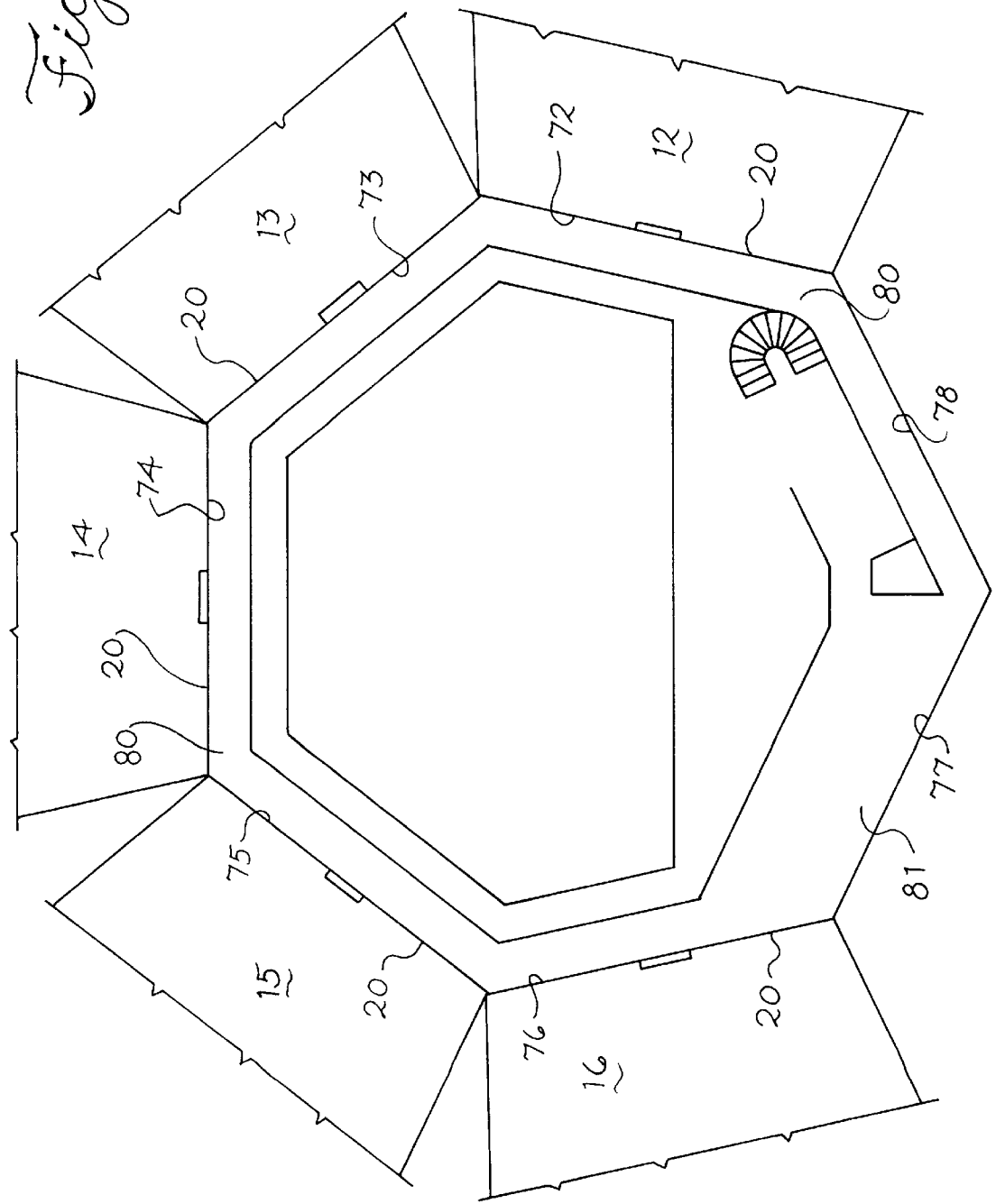
FIG. 3 is an enlarged plan view of the core of the building complex, with structure above the ground floor removed.

Turning now to FIG. 3, the center core structure 11 of the building complex 10 is seen in greater detail. The core structure (or building) 11 is seven sided, as has been pointed out. Six of its sides, 72, 73, 74, 75 and 76, mate with corresponding inner walls 20 of the wing structures 12, 13, 14, 15 and 16, respectively.

Two sides 77 and 78 of the seven-sided core structure 11 face the outside environment. In the preferred embodiment of the building complex 10, the side 77 would accommodate a waste material receiving area 17 and a personnel access area 18, as seen in FIG. 1.

Immediately inside the walls 72–78 of the core structure 11, a warehouse corridor 80 encircles the building. It opens up into a receiving area 81 adjacent the wall 77, however.

The internal areas of the core structure 11 would include, on various levels, labs and sample control features. Mechanical equipment, maintenance and office facilities would also be provided.

The building complex 10 which has been described can readily be expanded in two ways. First, the rhomboid shaped wing structures 12–16 which provide storage can be extended radially outwardly. Nevertheless, they remain separated from each other for safety reasons. Second, as previously indicated, of course, additional floors can be added.

We claim:

1. A building complex for disposal of toxic and otherwise hazardous waste material, comprising:

a) a center core in the form of a polygonal building structure having more than five sides; and b) a wing attached to and extending radially outwardly from each of at least five of said sides;

c) each of said wings comprising a generally rhomboid shaped building structure with an inner shorter wall, an outer longer wall, side walls, a roof and a floor;

d) said walls, floor and roof comprising concrete slabs coated with a layer of composite material comprising a mixture of thermosetting or thermoplastic resin, high modulus carbon fibers or the like and borosilicate glass particulate;

e) the interior of each of said wings being accessible only from said center core building structure.

* * * * *